(12) United States Patent  (10) Patent No.: US 7,120,639 B1
de Jong et al.  (45) Date of Patent: Oct. 10, 2006

(54) PLUGGABLE FORMATTERS

(75) Inventors: Stephen Peter de Jong, Bellevue, WA (US); Gopala Krishna R. Kakivaya, Sammamish, WA (US); Joseph L. Roxe, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 09/892,684

(22) Filed: Jun. 27, 2001

(51) Int. Cl.
*G06F 17/30* (2006.01)
*G06F 9/44* (2006.01)

(52) U.S. Cl. .......... 707/101; 707/102; 707/103 R; 707/104.1; 717/100

(58) Field of Classification Search ........ 707/100–103, 707/1–2, 6; 717/100, 101, 102, 103 R, 104.1
See application file for complete search history.

(56) References Cited

U.S. PATENT DOCUMENTS

| | | | |
|---|---|---|---|
| 6,292,933 B1* | 9/2001 | Bahrs et al. | 717/107 |
| 6,298,353 B1* | 10/2001 | Apte | 707/103 R |
| 6,598,222 B1* | 7/2003 | Uchihira et al. | 717/154 |
| 6,609,130 B1* | 8/2003 | Saulpaugh et al. | 707/102 |
| 6,636,886 B1* | 10/2003 | Katiyar et al. | 709/203 |
| 6,769,032 B1* | 7/2004 | Katiyar et al. | 709/246 |
| 6,829,771 B1* | 12/2004 | Bahrs et al. | 719/318 |
| 6,845,503 B1* | 1/2005 | Carlson et al. | 717/166 |
| 6,850,893 B1* | 2/2005 | Lipkin et al. | 705/8 |

FOREIGN PATENT DOCUMENTS

EP 1037154 A2 * 9/2000

OTHER PUBLICATIONS

Willett, "Processing of chemical and textual databases using the ICL DAP and transputer networks", IEEE, 1989.*
O'Ryan, et al., "The Design and Performance of a Pluggable Protocols Framework for Real-time Distributed Object Computing Middleware," 1999.
Philippsen, et al., "More Efficient Object Serialization," International Workshop on Java for Parallel and Distributed Computing, San Juan, Puerto Rico, Apr. 12, 1999.
Schmidt, et al., "Applying Patterns to Develop a Pluggable Protocols Framework for ORB Middleware," Design Patterns in Communications, Cambridge University Press, 2000, p. 1-23.
Vermeulen, et al., "The Pipeline Design Pattern," Rogue Wave Software, Inc., 1995, p. 1-17.

* cited by examiner

*Primary Examiner*—Thuy N. Pardo
(74) *Attorney, Agent, or Firm*—Amin & Turocy, LLP

(57) ABSTRACT

A system and method is provided for facilitating employment of pluggable formatters by providing a variety of functions or services outside the formatter for handling various functions associated with conventional formatters. The services can be employed to provide the basic functionality associated with serializing and deserializing graphs of objects. The present invention provides facilities which support the plugging in or functionality of formatters in any given wire format for transferring across a connection or between processes.

19 Claims, 11 Drawing Sheets

PLUGGABLE FORMATTERS

CROSS-REFERENCE TO RELATED APPLICATIONS

This application is related to co-pending divisional U.S. patent application Ser. No. 11/046,997, filed on Jan. 31, 2005, entitled, "PLUGGABLE FORMATTERS".

TECHNICAL FIELD

The present invention relates generally to serialization and deserialization of objects and more particularly, to a system and method with services that developers or users can employ to provide different formatters for serializing and deserializing objects in different externalized formats.

BACKGROUND OF THE INVENTION

Serialization is a mechanism for taking a data structure (e.g., a graph of objects, a call stack) and converting it to a stream of data in a particular external format. At deserialization, the stream of data is converted back into the data structure with the same topology of the original data structure. Serialization facilitates inter-process communication such as transmissions between address spaces, or persistence such as storage on a non-volatile media. For example, an executable program can be serialized at a server end and transferred over to an application running on a client end for executing the executable program at the client. Additionally, an object can be serialized and stored in contiguous memory to save space. Inter-process communications and object persistence are fundamental techniques used in many software applications. The main use of a serialization stream is for saving a graph of objects externally in a file or transferring the serialization data by remoting between computer process or processors.

A serialization stream externalizes the internal description of a graph of objects. The external description will vary depending on its uses. HTML and XML formats provide easy to read formats, which are widely used in interoperation between different systems. Binary formats are used for the efficient transfer of data. Typically, the formats that are used are selected for standards or computation reasons. Conventional distributed object systems may have built-in support for the operations involved in serialization and deserialization of data structures. Serialization is a standard part of many object frameworks. However, the format in which the serialization stream has been externalized is fixed according to the framework being utilized. Furthermore, conventional formats are not selectable, customizable or pluggable.

Serialization is typically performed by a formatter. Serialization involves writing the state information of parameters and/or objects to a stream that may be read by a formatter on a server, so that the parameters and/or objects can be recreated on the server side. Similarly, serialization involves writing the state information of return parameters and/or objects to a stream that may be read by a formatter on the client, so that the return parameters and/or objects can be recreated back on the client side. Formatters also typically perform the inverse operation of deserialization. The formatters dictate the format in which the parameters and/or objects and their associated state are written to the stream. For example, a first formatter may employ a binary format while a second formatter may employ an XML format to represent the types of the parameters and/or objects and their associated state. Conventionally, formatters are not selectable, pluggable or customizable and thus conventional systems suffer from problems associated with inflexibility (e.g., inability to interact with new externalized formats).

Thus, there remains an unmet need for a system and method that mitigates inflexibility problems associated with conventional formatters.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for facilitating employment of a pluggable formatter in a serialization and deserialization process. A plurality of services are provided that separate serialization/deserialization of one or more data structures (e.g., an object, graph of objects) from the encoding/decoding of the externalized format of a serialization stream. The serialization/deserialization information is the information about the object provided in the serialization stream and the externalized format refers to the encoding and decoding of the serialization stream (e.g., wire format). In one aspect of the invention, an architecture is provided that facilitates serialization of a graph of objects into streams of data in a selectable or pluggable format, and deserialization of the streams of data back into the graph of objects. The architecture provides a number of services associated with the basic functionality of serialization and deserialization graphs of objects. The present invention provides facilities which support the plugging in or functionality of formatters in any given wire format (e.g., binary, XML, HTML) for transferring across a connection or between processes.

In one aspect of the present invention, each object of an object graph is retrieved by a decision module, which determines if the object was previously retrieved, and then assigns a unique identification number to objects not previously retrieved. The fields of the object are then retrieved and the object serialized based on a user defined rule set. The user defined rule set can be provided by a class author within a class or within a third party file referred to as a surrogate. A surrogate is an object that specifies what information is serialized for an object of a particular type. A surrogate can be assigned to one or more objects in a graph and different surrogates can be assigned to different objects within a graph. If the object does not employ a predefined rule set, the decision module provides a default format for serialization. Once the serialization rules are determined a data structure can be populated with object information based on the selected rule set. A pluggable formatter can be provided to write the object to a wire or a file in any number of various wire type formats based on the specific pluggable formatter provided by a developer or user.

The plug-in formatter can include an object writer and a writer for serializing object data and providing object data to the wire. The writer can be wrapped around an API or the like for communicating with the decision module or a serialization architecture. The object writer pulls the object information from the object information layer and pushes it to a format writer. The format writer writes the encoded stream called by the object writer. The pluggable formatter can also include a parser and an object reader for receiving and deserialization of the data. The parser determines the type of encoded object if the information is on the stream. The object reader takes the parsed information from the encoded stream and interfaces to the object information layer to create the objects and register the objects. The object reader also determines the type of the encoded object if not found by the format parser. The object reader is coupled to a converter for repopulating an uninitialized instance of an object.

A formatter services component and an object manager are provided during deserialization of a graph of objects. The objects are decoded by the pluggable formatter and provided to the formatter services component for deserialization. The formatter services component instantiates an uninitialized instance of objects of a same, a similar or a different type for each object. As objects are deserialized, the objects are registered with the object manager, which tracks the occurrences of backward and forward references. Working together the formatter services component and the object manager maintain the invariants dictated by each object's rule set. Once the object is deserialized, the object can be populated with data from forward referenced objects, which is referred to as fixups. The object manager and the formatter services component can be provided as part of the underlying architecture to support the pluggable formatters.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

In conventional systems for serializing and deserializing a graph of objects, the type of object, assignment of object IDs, the way a serialization stream is populated and the externalized format of the serialization stream is dictated by the formatter during the serialization process. Additionally, the tracking of objects within the serialization stream, registering objects, handling forward and backward references and the reinstantiation of objects is dictated by the formatter during the deserialization process. The present invention provides a system and method for facilitating employment of pluggable formatters (i.e., formatters with different externalized formats) by providing a variety of functions or services outside the formatter for handling various serialization and deserialization functions associated with conventional formatters.

A plurality of services are provided that separate serialization/deserialization of a graph of objects from the encoding/decoding of the externalized format of the serialization stream. The serialization/deserialization information is the information about the object provided in the serialization stream or population information and the externalized format refers to the encoding and decoding of the serialization stream in a particular format. Although the present examples will be illustrated with respect to the serialization and deserialization of a graph of objects, it is to be appreciated that the present invention is applicable to serialization and deserialization of a number of different data structures (e.g., a call stack).

Figure 1:
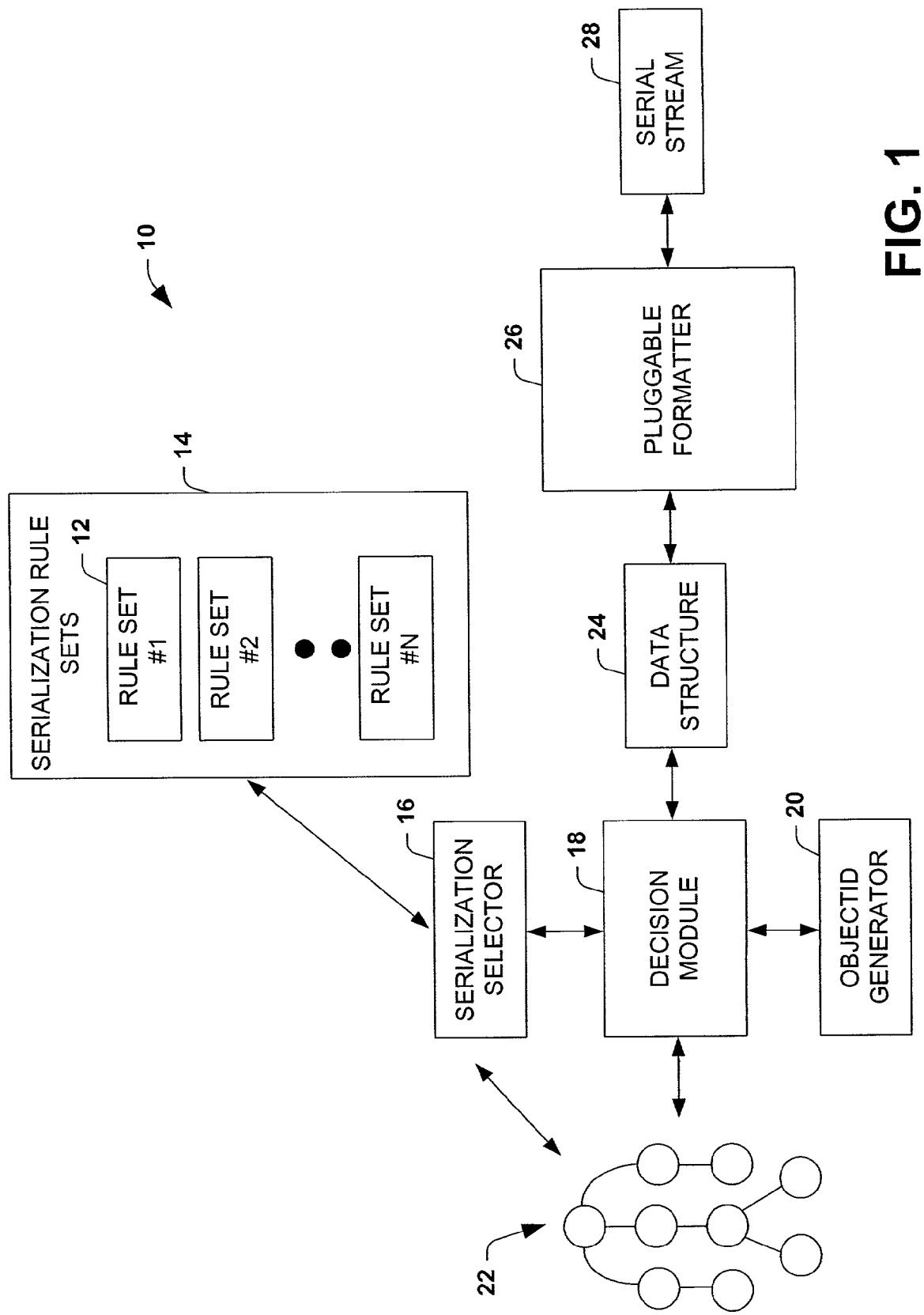
FIG. 1 is a schematic block diagram illustrating a system that facilitates serialization of a graph of objects into a serialization stream employing a pluggable formatter in accordance with one aspect of the present invention.

FIG. 1 illustrates a system 10 for implementing pluggable formatters for serialization of a graph of objects into a serial stream in accordance with one aspect of the present invention. The system 10 includes a decision module 18 that is responsible for retrieving objects within an object graph 22 and pushing those objects to a data structure 24. The decision module 18 determines if an object within the object graph was previously retrieved, and assigns objects an object ID via an object ID generator 20 if that object had not been previously retrieved. The decision module 18 or the object ID generator 20 maintains an object list for tracking previously retrieved objects. Once it is determined if the object was or was not previously retrieved and the object ID is assigned to that object, the decision module invokes a serialization selector 16. The serialization selector 16 matches a rule set 12 from a plurality of rule sets 14 to a particular object type or informs the decision module 18 where to find a rule set for the particular object type. The object can contain information that associates that object with a rule set and invokes methods of the rule set, for example, by implementing an interface or by inheriting methods of a base class.

Some objects have information that needs to be secured or cannot be serialized in a standard fashion. Therefore, one of the rule sets 12 can be provided to define how the object would be serialized or define how the object serialization information within the portion of the serialized stream containing the object information would get populated with object data and what object data would the serialization stream receive. Serialization information is essentially a series of name value pair representing fields of the objects with additional information contained in metadata such as object type and data type. Therefore, the rule set can dictate if another object is to be provided in place of that object or restrict the information that will be provided for that object.

The rule set 12 can be contained in one or more third party objects developed by a user or developer so that the user can define how they want objects of a particular class type to be populated to the data structure 24. Additionally, the rule set 12 can provide a replacement object type to be serialized such as a remote or proxy object or a reference object containing information about the real object. Alternatively, the rule set can be defined in the object that is being serialized (e.g., by implementing a serializable interface or by employing methods of an inherited serializable base class), so that developers can define how they want the stream populated defined in the object itself. A default serialization can be provided if an object is serializable (e.g., marked with serializable attributes), but no particular rule set is provided in another object or the object itself. The default serialization can be defined in a rule set 12 or embedded into the decision module 18.

After the decision module 18 determines how the serial stream 28 is going to be populated with a given object's information, the object information is then pushed to a data structure 24. This is then repeated for each object in the graph 22, until object information for all of the objects have been written to the data structure 24. The data structure 24 is then transmitted to a pluggable formatter 26. Alternatively, the objects can be serialized as they are retrieved (e.g., on the fly), such that the decision module 18 pushes the object to the data structure 24 one at a time, which are then transmitted to the pluggable formatter 26. This is then repeated for each object until the entire graph 22 has been serialized.

The formatter 26 is not concerned with what the object type is or how to populate the stream with object information because the serialization information has already been taken care of by the decision module 18 and the particular rule set associated with the object type. Removing the rules out of the formatter associated with populating a stream with object information allows for the formatters that are selectable, pluggable and customizable.

After the decision module 18 populates the data structure 24, the pluggable formatter 26 converts the data structure into a serial stream 28 in a particular externalized format defined by the pluggable formatter 26. For example, the pluggable formatter can write the serial stream 28 in XML, HTML, binary or a variety of other externalized formats. A variety of different formatters can be employed on the system 10, so that a developer can select between different externalized formats in which to serialize the object graph 22 into the serialized stream 28.

It is to be appreciated that although the components illustrated in the system 10 are shown as separate, the functionality of one or more components can be integrated into one another and the functionality of a component can be provided in one or more other components. For example, the decision module 18 and/or the object ID generator 20 can be integrated into one another or the pluggable formatter 26. In some situations, this may be more practical based on the differences and/or complexities associated with the externalized formats of the pluggable formatters.

Figure 2:
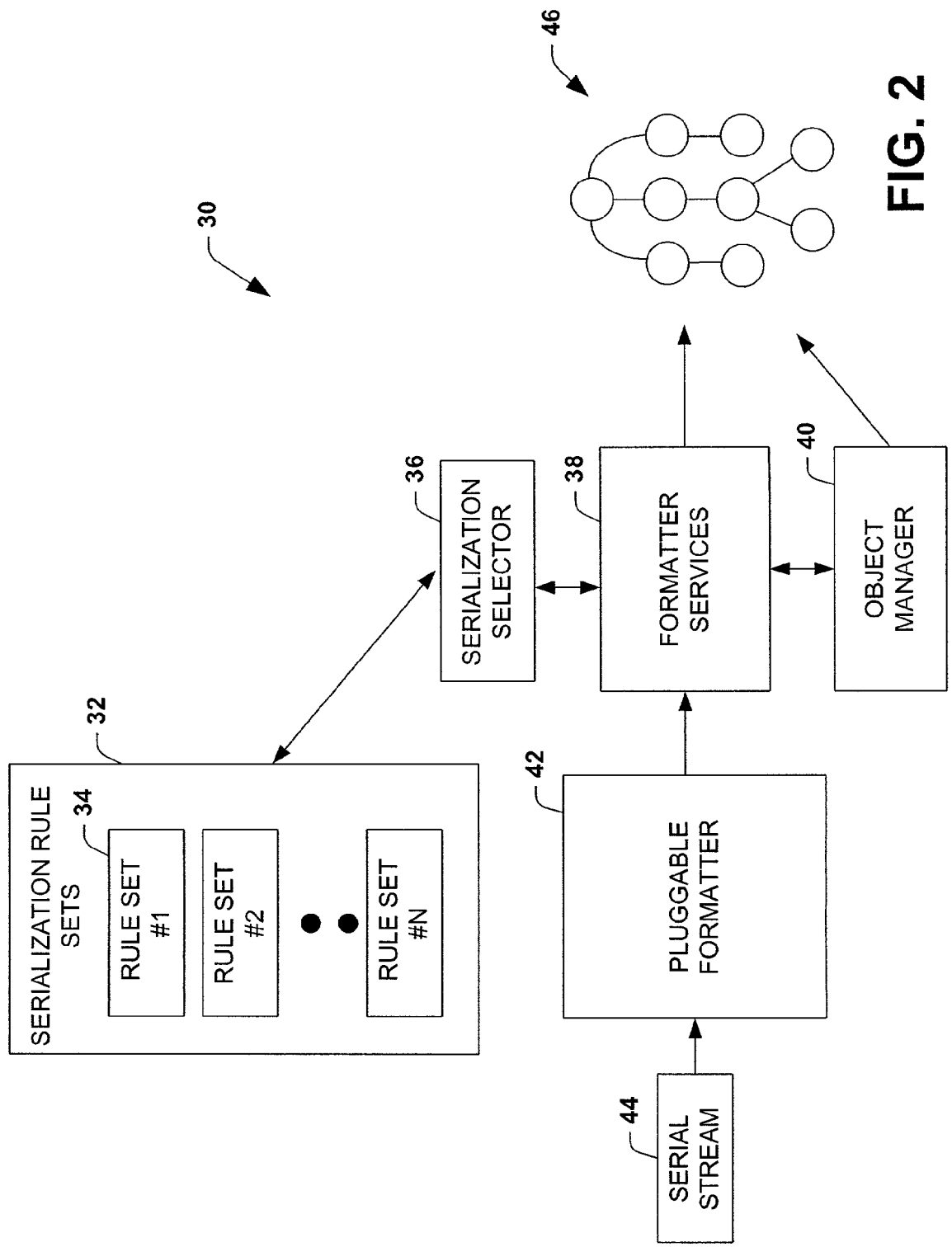
FIG. 2 is a schematic block diagram illustrating a system that facilitates deserialization of a serialization stream into a graph of objects employing a pluggable formatter in accordance with one aspect of the present invention.

FIG. 2 illustrates a system 30 for implementing pluggable formatters for deserialization of a serialized stream into a graph of objects in accordance with one aspect of the present invention. The system 30 includes a pluggable formatter 42 coupled to a formatter services component 38. The pluggable formatter 42 receives a serial stream 44 in an encoded/serialized format in which the pluggable formatter 42 is designed to convert into object form (e.g., decode). The formatter services component 38 works in conjunction with an object manager 40 to repopulate an object graph 46. The formatter services component 38 reads information from the pluggable formatter 42 that has received an object of a particular type. The formatter services component 38 then creates an uninitialized instance or object shell of that type, a similar type or another type, defined by a user, of which no constructor has been called.

The formatter services component 38 will invoke a serialization selector 36. The serialization selector 36 determines based on the object type, if a rule set 34 was employed out of a plurality of serialization rule sets 32 to serialize that particular object. If the object has a rule set 34 associated with it, the formatter services component 38 will employ the rule set and the serialization information to populate the uninitialized instance of the object. The serialization information implies the existence of a certain constructor with a certain signature. The object manager 40 tracks the objects as they are deserialized. Each object registers with the object manager 40 as it is deserialized. The object manager 40 looks at the object and determines references to other objects within the object (e.g., forward references, backward references). If the referenced object is not available (e.g., down the serialization stream), the object manager 40 records a fixup for that object. The object manager 40 also guarantees that the deserialization information is complete before an object can be called. Once the deserialization of one or all objects is complete, the object manager 40 performs the fixups to complete reinstantiation of the object or the graph 46.

In some circumstances, serialization is employed in remoting of objects and transmission of an object containing information about that object (e.g., restrictions of one instance per class) instead of the object itself. The present invention addresses these situations by providing functionality that provides a remote or reference object to the pluggable formatter, so that the pluggable formatter serializes these objects without needing the additional functionality required to address these special circumstances. Conventional formatters require this functionality to be embedded in the formatter itself, and thus do not allow for formatters that are selectable, pluggable or customizable.

Each object graph contains a graph root, which is the top object in the graph. There are two types of roots, one for serialization of objects and the other for remoting of objects. The graph root for a serialization object is an object or an array of objects. For remoting of objects, the top object is an object which implements a remoting service. This object contains the root of two graphs. One graph contains a message object which specifies the name of the method and the parameters of the method. For serialization it contains an array of objects which correspond to the parameters. Each parameter starts a new graph of objects to be serialized. For deserialization it contains an array specifying the types of the parameters. The deserialization process will create the parameters. The other graph contains an array of header objects, which specify information about the remoting call. For example, the array of header objects can specify the signature of the method if the method is overloaded, or the transaction ID if the remoting call is a part of a distributed transaction. Each header object contains a name value pair.

Figure 3:
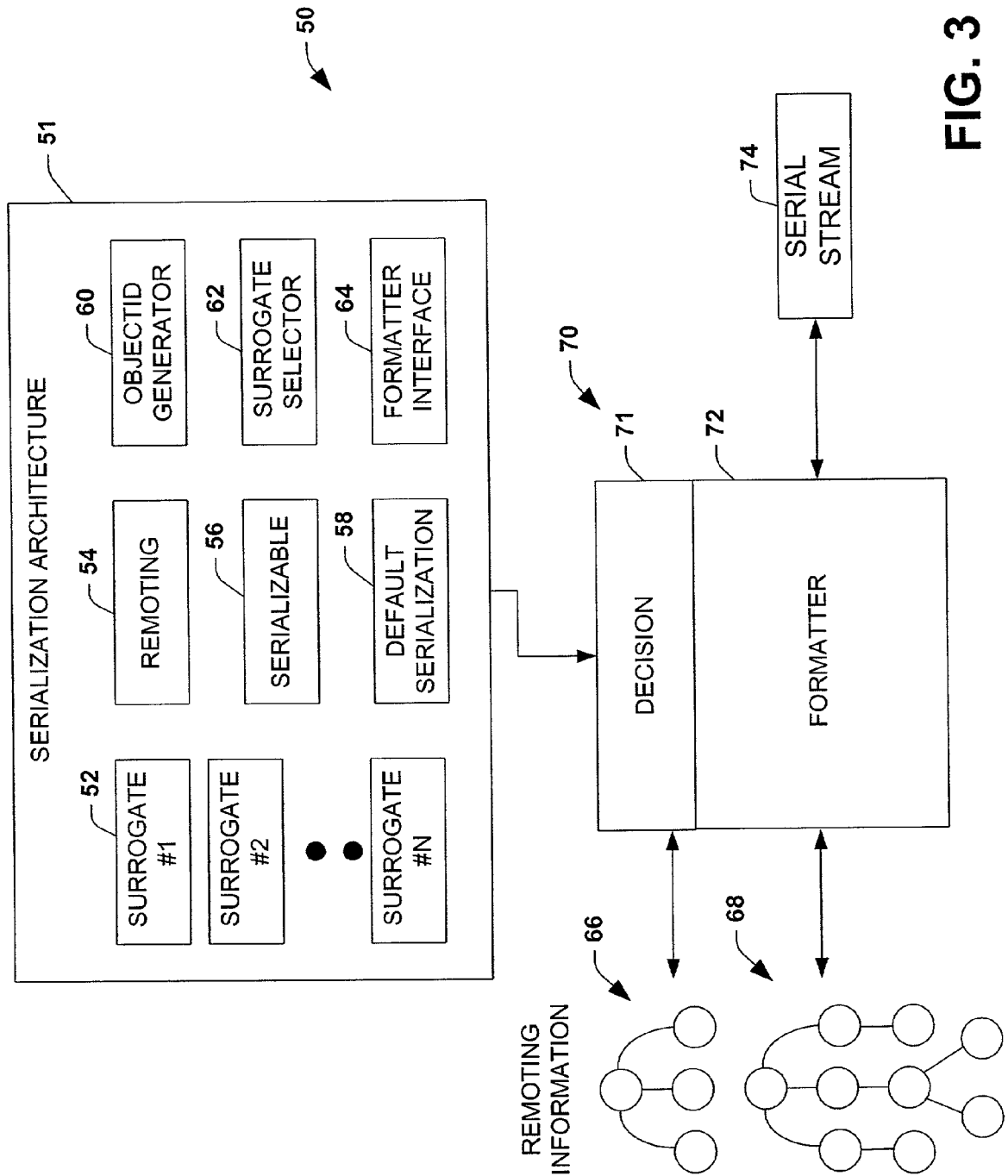
FIG. 3 is a schematic block diagram illustrating a system having a serialization architecture that facilitates serialization of a graph of objects into a serialization stream employing a pluggable formatter in accordance with one aspect of the present invention.

FIG. 3 illustrates a system 50 that includes an example of a serialization architecture 51 that supports both serialization of objects and remoting, which allows for pluggable formatters. The serialization architecture 51 is comprised of a plurality of components that could be interfaces, classes, methods, services or functions that are called, implemented, inherited or invoked by a pluggable formatter 70. A formatter interface component 64 is implemented by any class that wishes to hold itself out as a pluggable formatter. The formatter interface component 64 provides base functionality for runtime serialization formatters. The formatter interface 64 provides the methods to carry out the serialization process. By default, the serialization process records an object's state by gathering the values of all of its fields (e.g., public and private). These fields are saved to the stream along with information (e.g., metadata) about the object such as the assembly-qualified name for its type.

The serialization architecture 51 allows developers to select how they would like their objects serialized. For example, a class author can provide a surrogate selector component 62 in the object. The surrogate selector component 62 controls the selection of a surrogate 52 from a plurality of surrogates that is to be used to define how a stream will be populated with object information by a formatter 70. A surrogate allows a developer to specify an object that knows how to handle the serialization of a particular object or a class of objects. Objects that wish to control their own serialization can do so by implementing a serializable component 56 in their class. The serialization component 56 provides methods for allowing an author to specify how the object is to be serialized within the object. If a class author wants the object to be serializable, the class author can mark that object as being serializable. A default serialization component 58 will then be employed for serialization of the object. If any object in the graph is not serializable, the formatter interface 64 will fail serialization.

The pluggable formatter 70 includes a built-in decision portion 71 responsible for retrieving objects within an object graph 68 and pushing those objects to a formatter portion 72 for serialization and encoding into an externalized format. The decision portion 71 can be implemented into a variety of pluggable formatters with different externalized formats. The decision portion 71 also determine if an object within the object graph was previously retrieved, and assigns objects an object ID via an object ID generator 60 if that object had not been previously retrieved. The decision portion 71 or the object ID generator 60 maintains an object list for tracking previously retrieved objects. Once it is determined if the object was or was not previously retrieved and the object ID is assigned to that object, the decision portion 71 determines if the object is serializable (e.g., marked with serializable attributes).

If the object is not serializable, the decision portion 71 returns a failure through the formatter interface component 64. If the object is serializable, the decision portion 71 proceeds. The decision portion 71 then determines if the object has a surrogate selector 62. If there is a surrogate selector 62 for that particular object, the decision portion 71 then asks the surrogate selector if it wishes to handle serialization of objects of this type. If so, the pluggable formatter 70 takes the selected surrogate 52 provided by the surrogate selector 62 and retrieves the object data based on the rules defined in the selected surrogate 52. If there is no surrogate, the decision portion 71 determines if the object implements the serializable component 56. If the object does implement the serializable component 56, methods of the serializable component are employed based on the definition defined by the class author within the object. If there is no surrogate 52 and the object does not implement the serializable component 56, the methods provided by the default serialization component 58 are employed to get an array of field info-value pairs. If the object is determined to employ remoting (e.g., the top object implements the remoting component 54), the pluggable formatter 70 is provided with a remoting information object 66. The remoting information object 66 provides the pluggable formatter 70 with information necessary to serialize the appropriate object (e.g., remote or proxy object, reference object). The formatter 70 then writes the data out to the stream in whichever externalized form that is defined by the given pluggable formatter portion 72.

Figure 4:
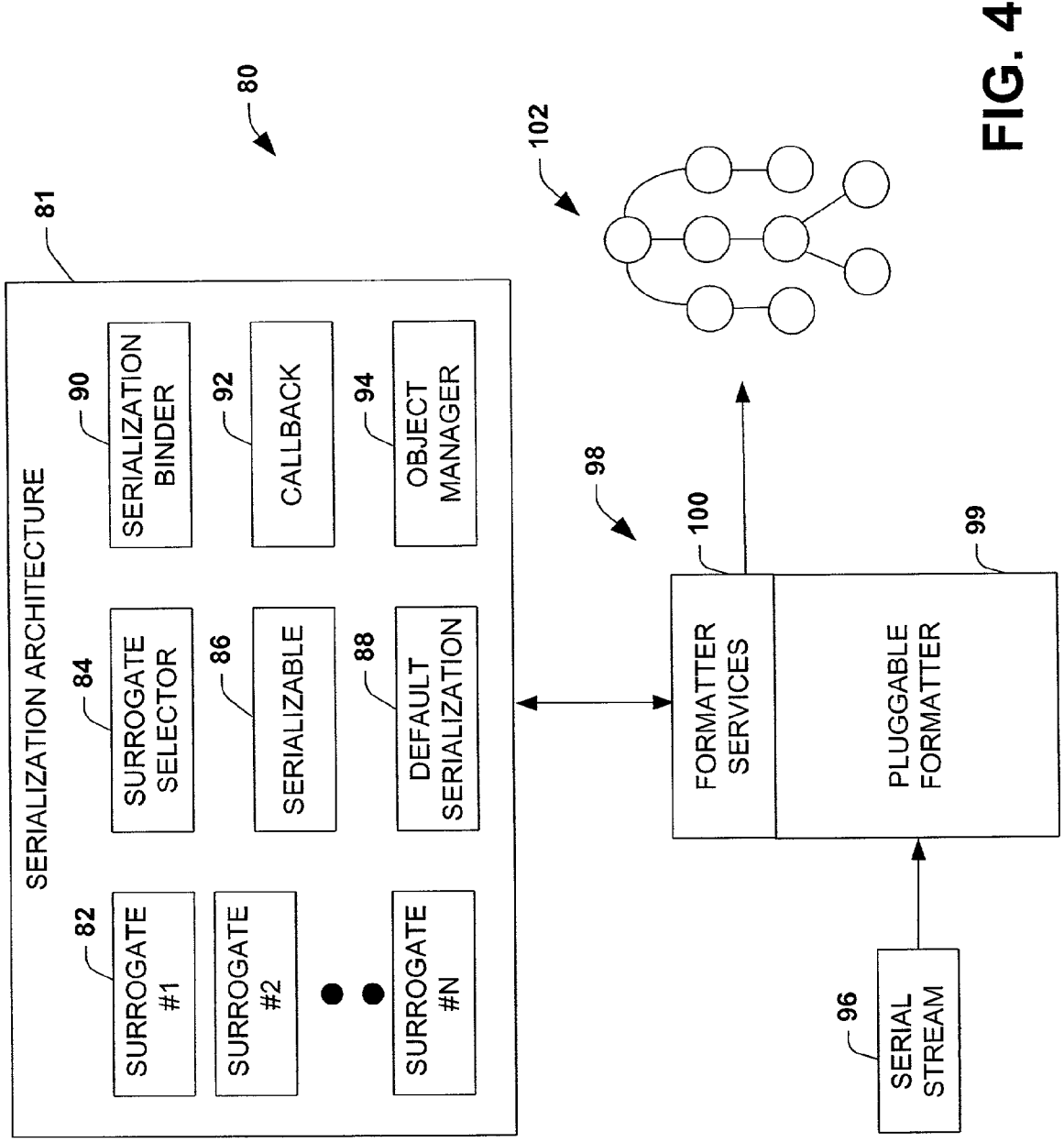
FIG. 4 is a schematic block diagram illustrating a system having a serialization architecture that facilitates deserialization of a serialization stream into a graph of objects employing a pluggable formatter in accordance with one aspect of the present invention.

FIG. 4 illustrates a system 80 for converting a serialized stream 96 into a graph of objects 102 in accordance with one aspect of the present invention. The system 80 includes an example of a serialization architecture 81 that supports deserialization of objects and allows for pluggable formatters. The serialization architecture 81 is comprised of a plurality of components that could be interfaces, classes, methods, services or functions that are called, implemented, inherited or invoked by a pluggable formatter. The system 80 includes a formatter 98 having a pluggable formatter portion 99 and a formatter services portion 100. The formatter services portion 100 can be a separate component, part of the architecture 81 or embedded into the pluggable formatter 98 as illustrated in FIG. 4. The formatter 98 receives a serial stream 96 in an encoded/serialized format in which the formatter 98, employing the formatter services portion 100, the pluggable formatter portion 99 and the serialization architecture 81, is designed to convert into object form (e.g., decode, deserialize).

The formatter services portion 100 reads information from the pluggable formatter portion 99 that has received an object of a particular type. Given the string forms of the type and assembly names, the formatter services portion 100 checks with a serialization binder component 90 as to what is the correct object type to employ in deserialization. In standard cases, the serialization binder component 90 will return a null indicating to the formatter services portion 100 to load the type specified in the stream. However, in some circumstances the developers or users want to repopulate an object of a different type or the same type in a different assembly. In these situations, the serialization binder component 90 will return a different type.

Once the type is determined, the formatter services portion 100 creates an uninitialized instance of that type. No constructor is ever called on this object. The object is then registered with an object manager component 94 along with its object ID. The object manager component 94 then checks if this type has a surrogate selector 84 to determine if the surrogate selector 84 wishes to control the deserialization of objects of that type. If the surrogate selector 84 does exist and does wish to control deserialization, serialization information of the object is read from the serialization stream 96 and the appropriate surrogate 82 is returned by the surrogate selector 84. If the type requires a serializable component 86, the serialization information of the object is read from the serialization stream 96 and the serializable component 86 is called. Otherwise, the serialization information of the object is read from the serialization stream 96 and the default serialization component 88 is called.

The object manager 94 tracks the objects as they are deserialized. The object manager 94 looks at the object and determines if the object has a forward reference to some object later in the stream. In this case the formatter services portion 100 or the formatter 98 registers the serialization information, the object and any fixups with the object manager 94. The formatter services portion 100 then populates the uninitialized object with any data that is available. The object manager 94 performs fixups during the deserialization process. After deserialization of the stream 96, the object manager also calls a deserialization callback component, which allows the object to do some fixups that are not possible when the graph 102 is only partially deserialized (e.g., hashtables). The object manager 94 will also handle any remoting procedures (e.g., extracting the real object for any object that transmitted a reference to that object, proxies).

Figure 5:
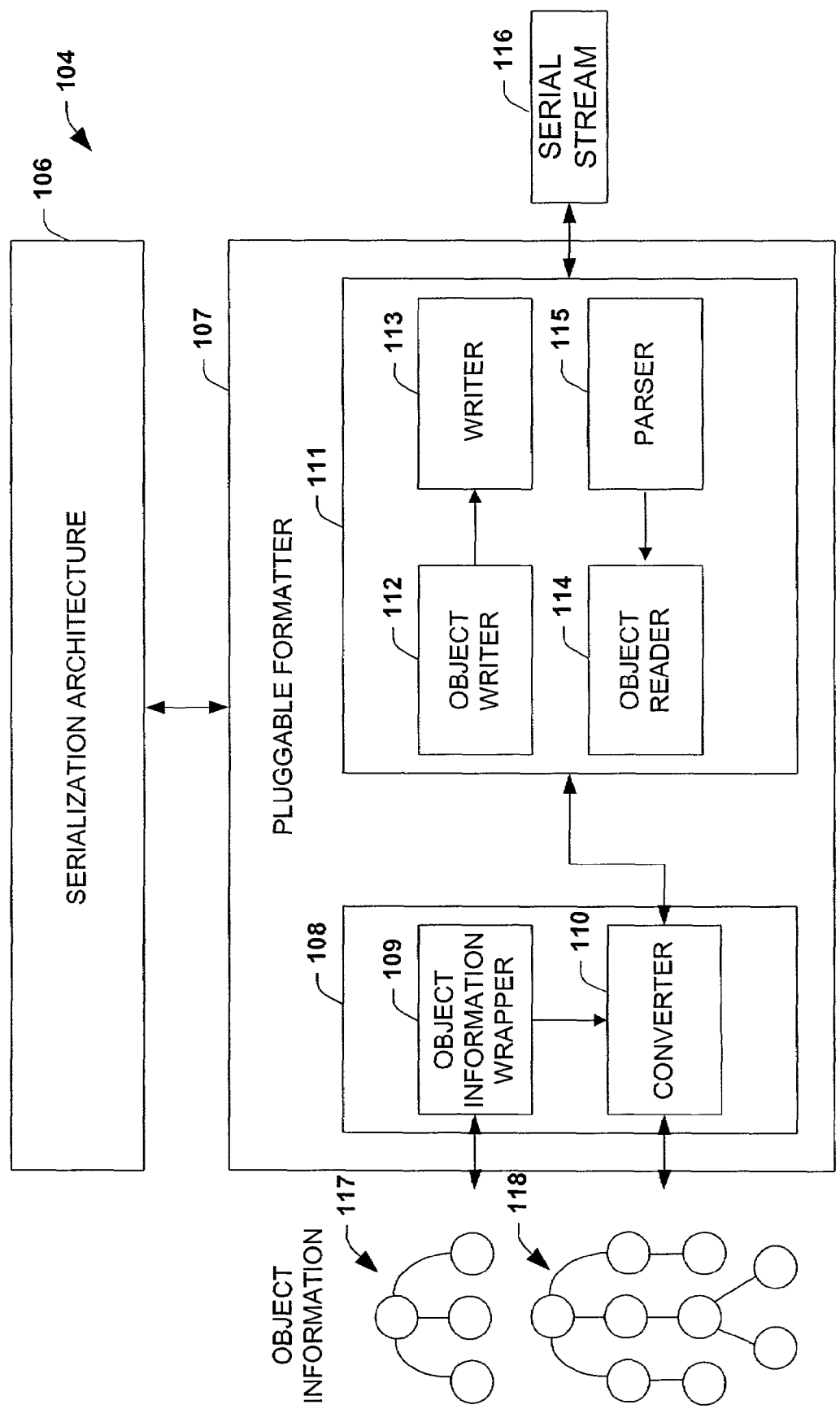
FIG. 5 is a schematic block diagram illustrating a system with a pluggable formatter interacting with a serialization architecture in serializing and deserializing a graph of objects in accordance with one aspect of the present invention.

FIG. 5 illustrates a system 104 in which the functionality of the decision portion of the pluggable formatter for serialization and the formatter services component for deserialization is provide in a serialization architecture 106. A pluggable formatter 107 interacts with the serialization architecture as described in FIGS. 3–4 to serialize an object graph 118 into a serial stream 116 and to deserialize the serial stream 116 back into the object graph 118. The pluggable formatter 107 includes a conversion module 108 coupled to a read/write module 111. The conversion module 108 includes an object information wrapper 109 used to provide a common interface between the different object behaviors (e.g., serialization rules, remoting rules). The object information wrapper 109 is provided with object information 117. The conversion module 108 also includes a converter 110 used to convert between external encoded types and internal object types.

The read/write module 111 includes an object writer 112 that pulls the object information from the object information layer and pushes it to a format writer 113. The format writer 113 writes the encoded stream called by the object writer 112. The read/write module 111 also includes a format parser 115 which reads the encoded stream and pushes the data to an object reader 114. The format parser 115 determines the type of encoded object if the information is on the stream. The object reader 114 takes the parsed information from the encoded stream and interfaces to the object information layer to create the objects and register the objects. The object reader 114 also determines the type of the encoded object if not found by the format parser 115.

In view of the foregoing structural and functional features described above, a methodology in accordance with various aspects of the present invention will be better appreciated with reference to FIGS. 6–9. While, for purposes of simplicity of explanation, the methodology of FIGS. 6–9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. It is further to be appreciated that the following methodology may be implemented as computer-executable instructions, such as software stored in a computer-readable medium. Alternatively, the methodology may be implemented as hardware or a combination of hardware and software.

Figure 6:
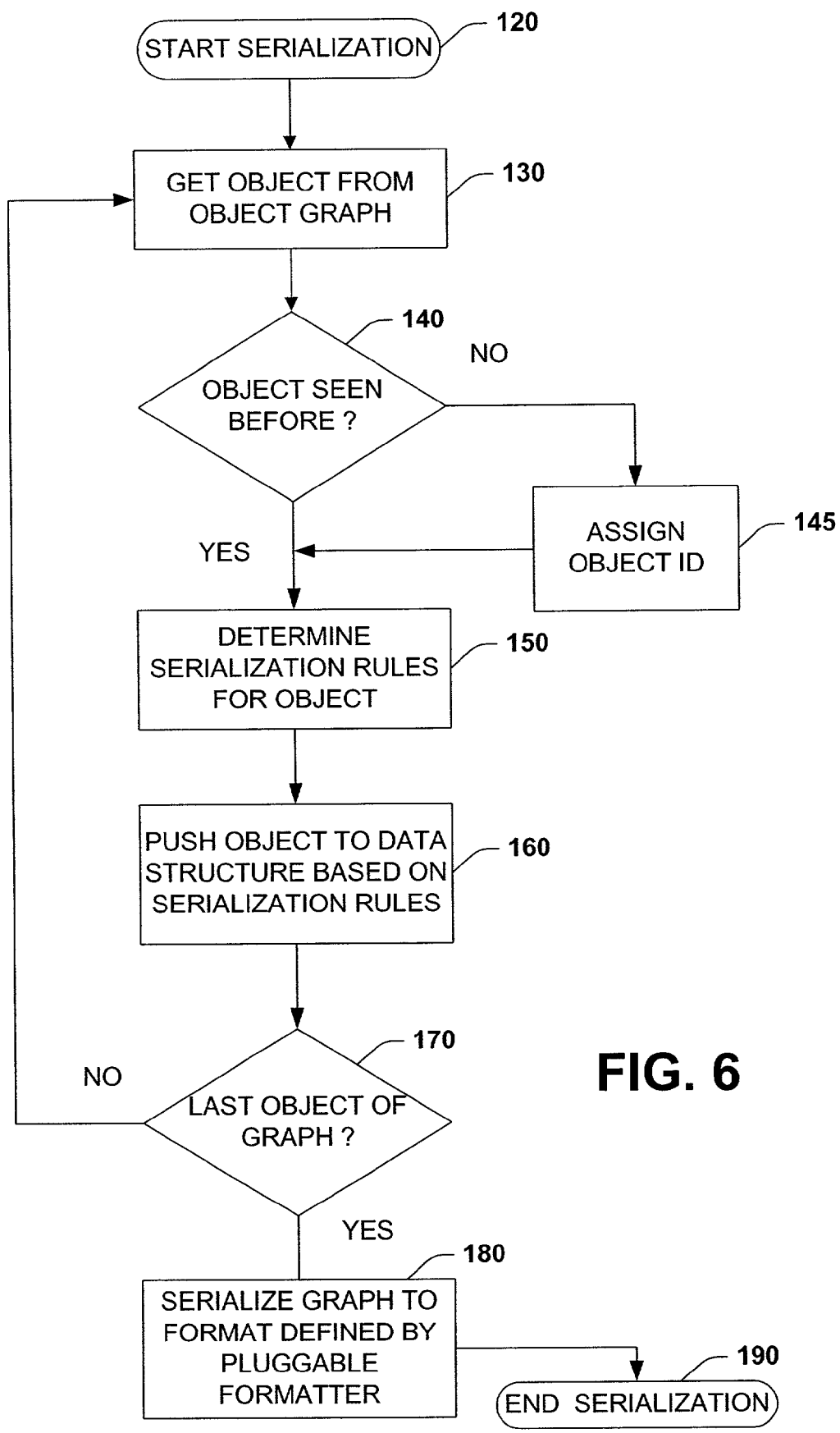
FIG. 6 illustrates a flow diagram of a methodology of serialization of a graph of objects into a serialization stream in accordance with one aspect of the present invention.

FIG. 6 illustrates one particular methodology for serialization of a graph of objects into a serialization stream in accordance with one aspect of the present invention. The methodology begins at 120 where serialization is invoked to serialize a graph of objects. At 130, an object is retrieved from an object graph. At 140, the method determines if the object has been seen before. If the object has been seen before (YES), the method proceeds to 150. If the method has not been seen before (NO), the method advances to 145 where the object is assigned an object ID. At 150, the methodology determines the serialization rules for that object within the object from a plurality of serialization rules. For example, the object may define the serialization rules as residing in another object, invoke serialization rules within the object or apply default serialization rules. At 160, the object is pushed to a data structure based on the serialization rules defined within the object. At 170, the methodology determines if the object is the last object of the graph. If the object is not the last object of the graph (NO), the methodology returns to 130 to get the next object of the graph. If the object is the last object of the graph (YES), the methodology proceeds to step 180. At 180, the graph is serialized to an externalized format defined by the pluggable formatter. The serialization routine then is completed at 190.

Figure 7:
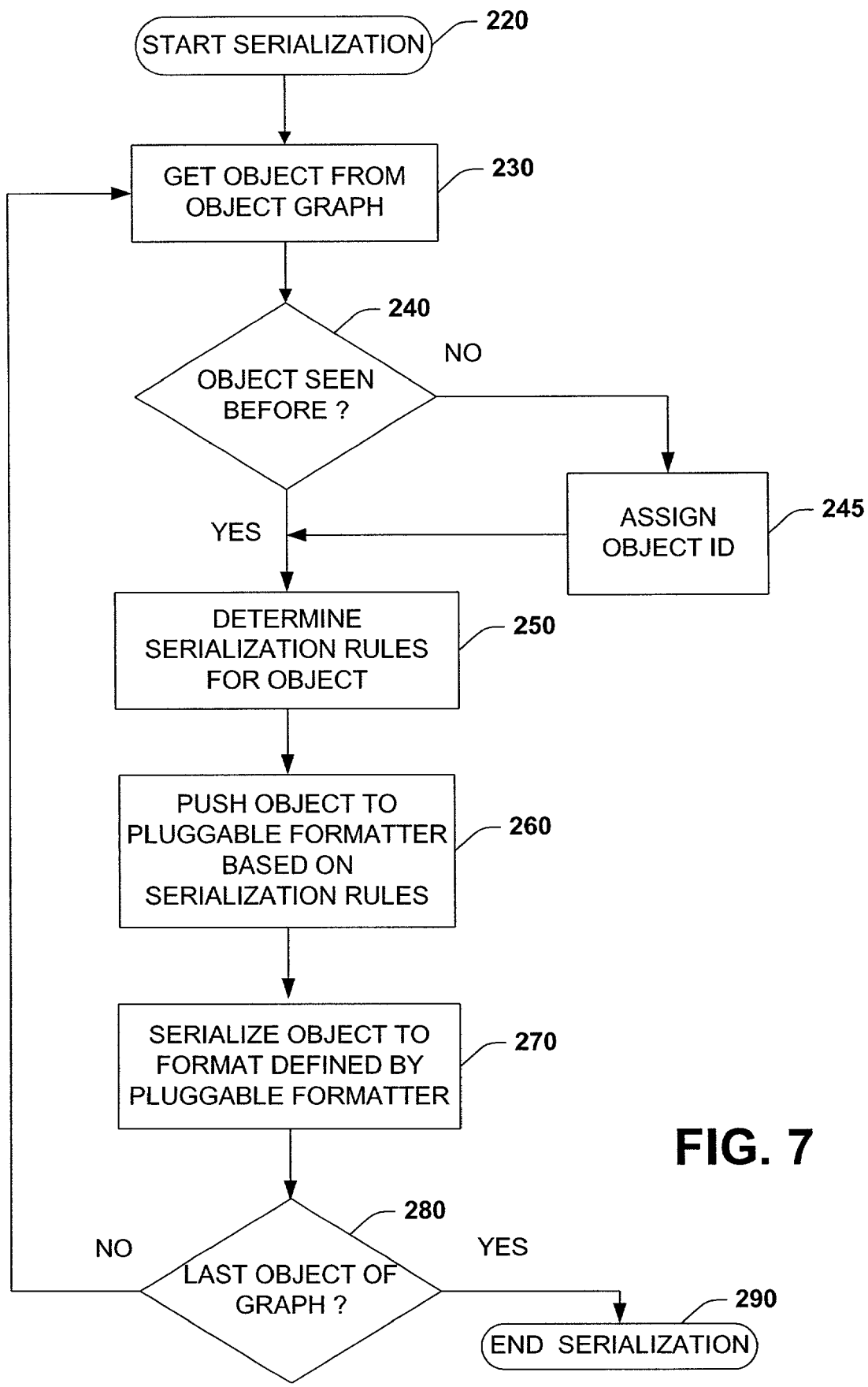
FIG. 7 illustrates a flow diagram of a methodology of serialization of a graph of objects into a serialization stream in accordance with another aspect of the present invention.

FIG. 7 illustrates another particular methodology for serialization of a graph of objects into a serialization stream in accordance with one aspect of the present invention. The methodology begins at 220 where serialization is invoked to serialize a graph of objects. At 230, an object is retrieved from an object graph. At 240, the method determines if the object has been seen before. If the object has been seen before (YES), the method proceeds to 250. If the method has not been seen before (NO), the method advances to 245 where the object is assigned an object ID. At 250, the methodology determines the serialization rules for that object within the object from a plurality of serialization rules. For example, the object may define the serialization rules as residing in another object, invoke serialization rules within the object or apply default serialization rules. At 260, the object is pushed to a pluggable formatter based on the serialization rules defined within the object. At 270, the graph is serialized to an externalized format defined by the pluggable formatter. At 280, the methodology determines if the object is the last object of the graph. If the object is not the last object of the graph (NO), the methodology returns to 230 to get the next object of the graph. If the object is the last object of the graph (YES), the methodology proceeds to step 290. The serialization routine then is completed at 290.

Figure 8:
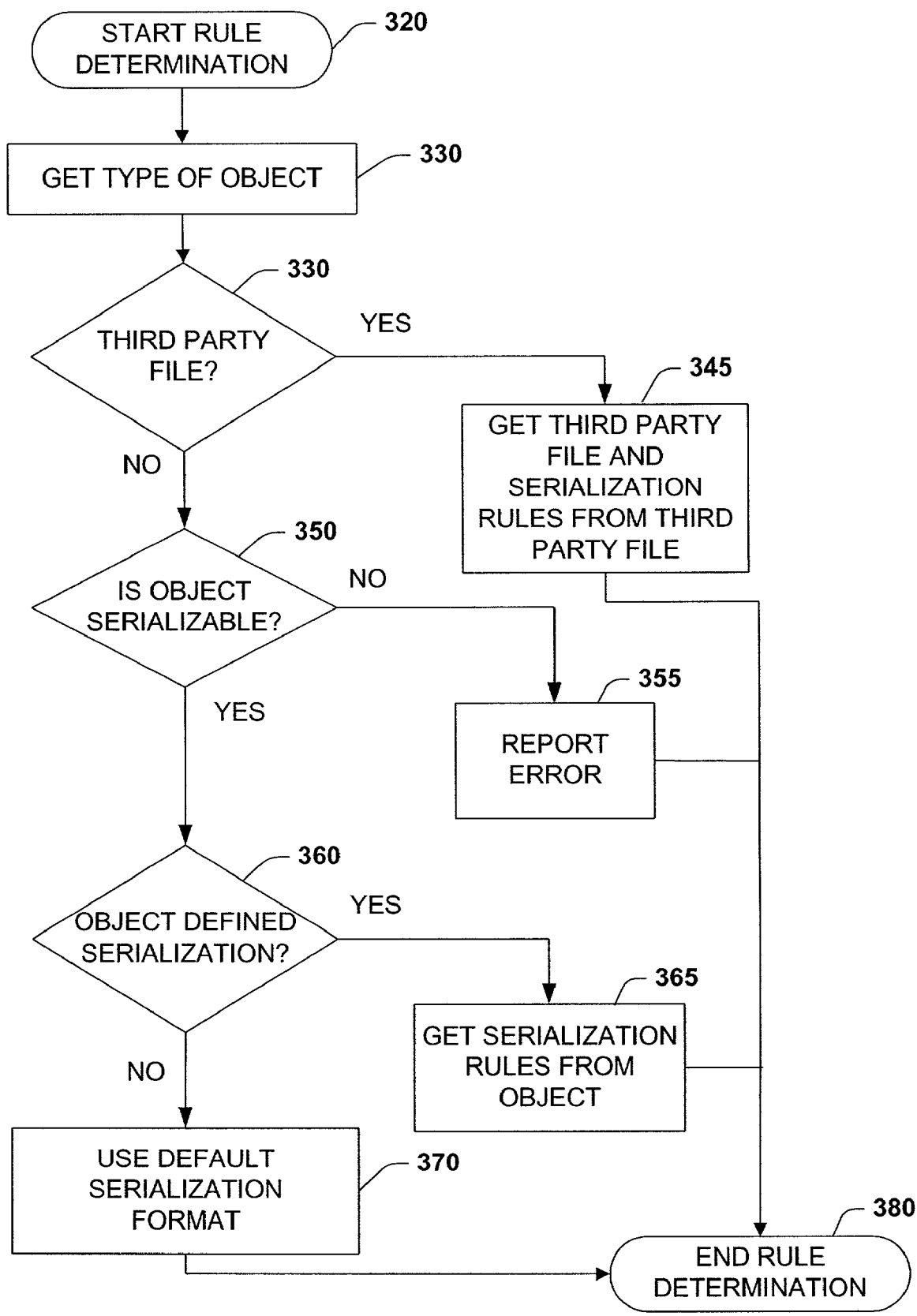
FIG. 8 illustrates a flow diagram of a methodology of determining a serialization rule for an object in accordance with another aspect of the present invention.

FIG. 8 illustrates one particular methodology for determining serialization rules for an object in accordance with one aspect of the present invention. The methodology begins at 320 where rule determination begins. At 330, the methodology retrieves an object from an object graph and determines the type of object being serialized. Based on the object type, a determination is made on whether or not serialization rules are defined in a third party file at 340. If serialization rules are defined in a third party file (YES), the methodology proceeds to 345. At 345, the third party file and the serialization rules from the third party file are retrieved. The rule determination then ends at 380. If serialization is not defined in a third party file (NO), the methodology proceeds to 350. At 350, a determination is made on whether the object is serializable. If the object is not serializable (NO), the method proceeds to 355 to return an error. The rule determination then ends at 380. If the object is serializable (YES), the methodology advances to 360. At 360, a determination is made of whether serialization rules are defined in the object. If the serialization rules are defined in the object (YES), the method proceeds to 365 to retrieve the serialization rules from the object. If the serialization rules are not defined in the object (NO), the method proceeds to 370 to retrieve the default serialization rules. The rule determination then ends at 380.

Figure 9:
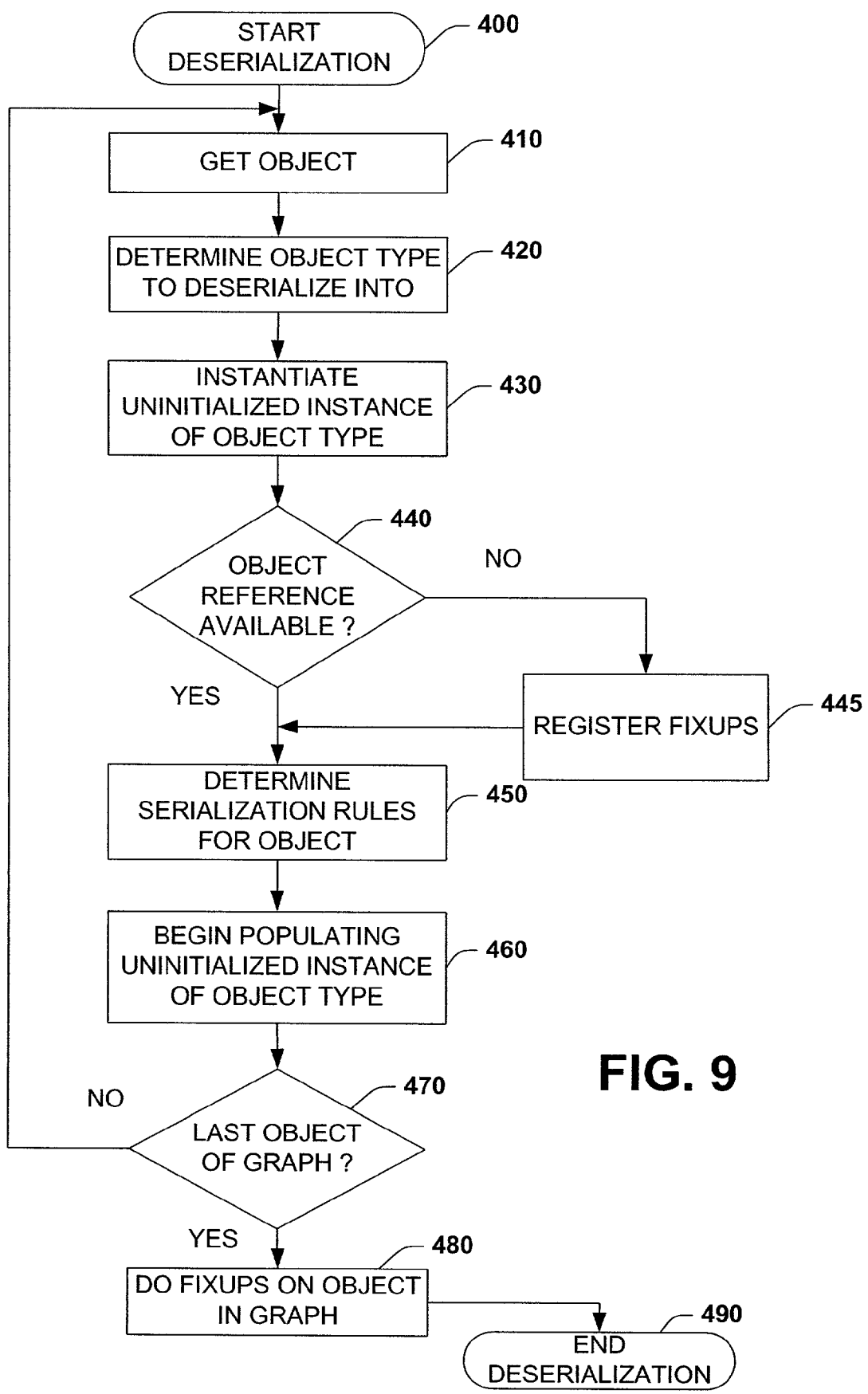
FIG. 9 illustrates a flow diagram of a methodology of deserialization of a serial stream into a graph of objects in accordance with one aspect of the present invention.

FIG. 9 illustrates one particular methodology for deserialization of a serialization stream into a graph of objects in accordance with one aspect of the present invention. The methodology begins at 400 where deserialization is invoked to deserialize a serialization stream into a graph of objects. At 410, an object is retrieved from a serialization stream and registered with an object manager or the like. At 420, the methodology determines what object type is to be populated with object information. For example, the object type can be the same type as the type off the serialization stream or another type defined by the user. At 430, the methodology instantiates an uninitialized instance of the selected object type. At 440, the methodology determines if the object has any objects it references that have not been seen previously. If the object does not have any objects that it references that have not been seen previously, the method proceeds to 450. If the object does have objects that it references that have not been seen previously, the method advances to 445 where the object registers fixups with the object manager corresponding to any objects it references that are not currently available. The object manager can perform fixups to the object graph in parallel with objects being registered once the objects that are referenced become available. At 450, the methodology determines the serialization rules for that object within the object from a plurality of serialization rules.

For example, the object may define the serialization rules as residing in another object, invoke serialization rules within the object or apply default serialization rules. At 460, the methodology begins populating an uninitialized instance of the object type. At 470, the methodology determines if the object is the last object of the graph. If the object is not the last object of the graph (NO), the methodology returns to 410 to get the next object of the graph. If the object is the last object of the graph (YES), the methodology proceeds to step 480. At 480, all final or callback fixups (e.g., hashtables) are performed on objects in the graph. The deserialization routine then is completed at 490.

Figure 10:
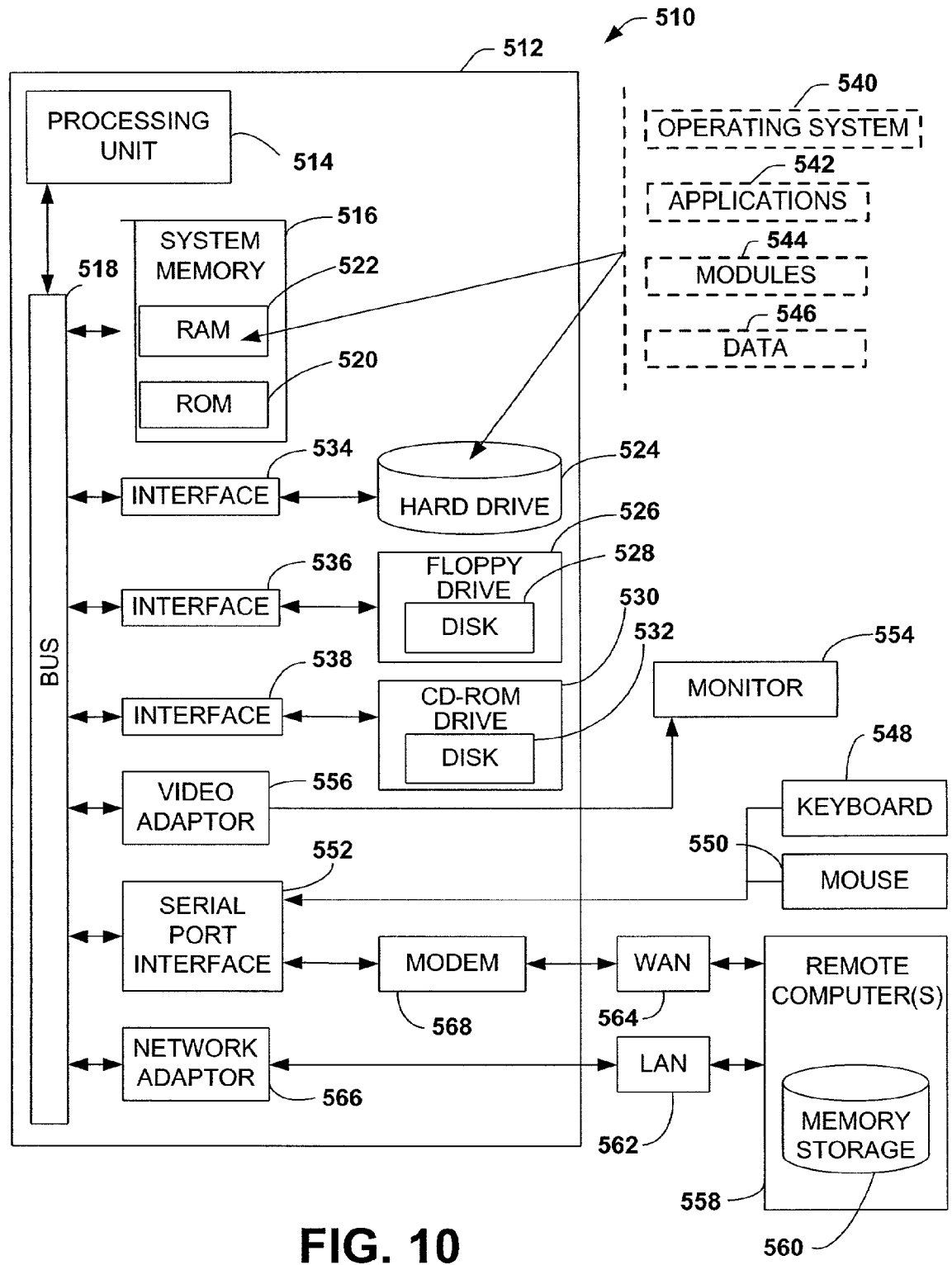
FIG. 10 illustrates a schematic block diagram of an exemplary operating environment for a system configured in accordance with the present invention.

In order to provide additional context for various aspects of the present invention, FIG. 10 and the following discussion are intended to provide a brief, general description of one possible suitable computing environment 510 in which the various aspects of the present invention may be implemented. It is to be appreciated that the computing environment 510 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 10 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 10, the exemplary environment 510 for implementing various aspects of the invention includes a computer 512, including a processing unit 514, a system memory 516, and a system bus 518 that couples various system components including the system memory to the processing unit 514. The processing unit 514 may be any of various commercially available processors. Dual microprocessors and other multi-processor architectures also can be used as the processing unit 414.

The system bus 518 may be any of several types of bus structure including a memory bus or memory controller, a peripheral bus, and a local bus using any of a variety of commercially available bus architectures. The computer memory 516 includes read only memory (ROM) 520 and random access memory (RAM) 522. A basic input/output system (BIOS), containing the basic routines that help to transfer information between elements within the computer 512, such as during start-up, is stored in ROM 520.

The computer 512 may further include a hard disk drive 524, a magnetic disk drive 526, e.g., to read from or write to a removable disk 528, and an optical disk drive 530, e.g., for reading a CD-ROM disk 532 or to read from or write to other optical media. The hard disk drive 524, magnetic disk drive 526, and optical disk drive 530 are connected to the system bus 518 by a hard disk drive interface 534, a magnetic disk drive interface 536, and an optical drive interface 538, respectively. The computer 512 typically includes at least some form of computer readable media.

Computer readable media can be any available media that can be accessed by the computer 512. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 412. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 522, including an operating system 540, one or more application programs 542, other program modules 544, and program non-interrupt data 546. The operating system 540 in the computer 512 can be any of a number of commercially available operating systems.

A user may enter commands and information into the computer 512 through a keyboard 548 and a pointing device, such as a mouse 550. Other input devices (not shown) may include a microphone, an IR remote control, a joystick, a game pad, a satellite dish, a scanner, or the like. These and other input devices are often connected to the processing unit 514 through a serial port interface 552 that is coupled to the system bus 518, but may be connected by other interfaces, such as a parallel port, a game port, a universal serial bus ("USB"), an IR interface, etc. A monitor 554, or other type of display device, is also connected to the system bus 518 via an interface, such as a video adapter 556. In addition to the monitor, a computer typically includes other peripheral output devices (not shown), such as speakers, printers etc.

The computer 512 may operate in a networked environment using logical and/or physical connections to one or more remote computers, such as a remote computer(s) 558. The remote computer(s) 558 may be a workstation, a server computer, a router, a personal computer, microprocessor based entertainment appliance, a peer device or other common network node, and typically includes many or all of the elements described relative to the computer 512, although, for purposes of brevity, only a memory storage device 560 is illustrated. The logical connections depicted include a local area network (LAN) 562 and a wide area network (WAN) 564. Such networking environments are commonplace in offices, enterprise-wide computer networks, intranets and the Internet.

When used in a LAN networking environment, the computer 512 is connected to the local network 562 through a network interface or adapter 566. When used in a WAN networking environment, the computer 512 typically includes a modem 568, or is connected to a communications server on the LAN, or has other means for establishing communications over the WAN 564, such as the Internet. The modem 568, which may be internal or external, is connected to the system bus 518 via the serial port interface 552. In a networked environment, program modules depicted relative to the computer 512, or portions thereof, may be stored in the remote memory storage device 560. It will be appreciated that the network connections shown are exemplary and other means of establishing a communications link between the computers may be used.

Figure 11:
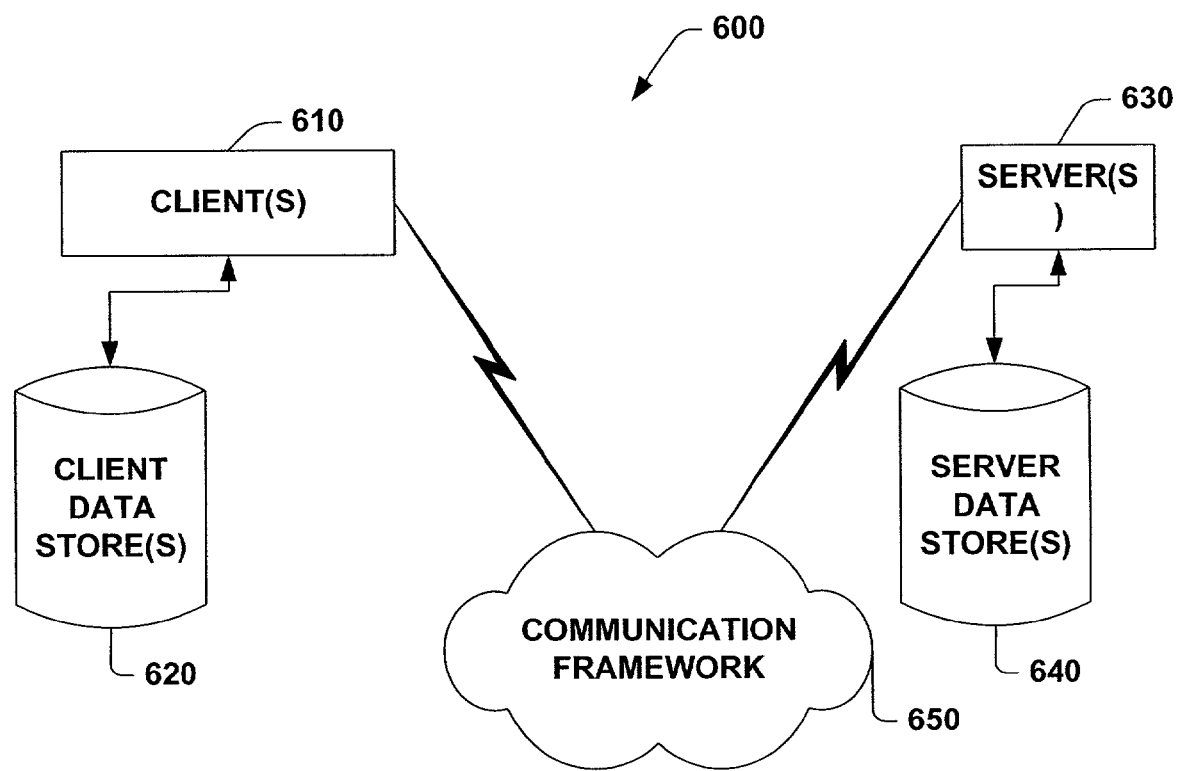
FIG. 11 is a schematic block diagram of an exemplary communication environment configured in accordance with the present invention.

FIG. 11 is a schematic block diagram of a sample computing environment 600 with which the present invention may interact. The system 600 includes one or more clients 610. The clients 610 may be hardware and/or software (e.g., threads, processes, computing devices). The system 600 also includes one or more servers 630. The servers 630 may also be hardware and/or software (e.g., threads, processes, computing devices). The clients 610 may house one or more proxies that can be employed, in a distributed object environment, to image server objects housed on the servers 630.

The system 600 includes a communication framework 650 that can be employed to facilitate communications between the clients 610 and the servers 630. The clients 610 are operably connected to one or more client data stores 615 that can be employed to store information local to the clients 610 (e.g., pluggable formatters, serialization architecture). Similarly, the servers 630 are operably connected to one or more server data stores 640 that can be employed to store information local to the servers 630 (e.g., pluggable formatters, serialization architecture).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A system that facilitates employment of a pluggable formatter, comprising:
   a decision module that retrieves a first data structure as a graph of objects for serialization thereof;
   a plurality of rule sets that define serialization information about data structure types;
   a surrogate that specifies serialization instructions for all objects of a given type; and
   a serialization selector that determines a rule set of the plurality of rule sets to provide to the decision module based on the data structure type, the decision module populating a second data structure based on the serialization information and providing a pluggable formatter with the second data structure, so that the pluggable formatter can serialize the second data structure to an externalized format defined by the pluggable formatter, the pluggable formatter is selected from a variety of pluggable formatters employed on the system.

2. The system of claim 1, the rule set is definable in the data structure.

3. The system of claim 1, the rule set is defined in a third party file.

4. The system of claim 1, the rule set is a default format based on markings in the first data structure.

5. The system of claim 1, the first data structure being a graph of objects.

6. The system of claim 1, further comprising an object ID generator coupled to the decision module, the object ID generator assigns object IDs to each object in the graph of objects.

7. The system of claim 1, the data structure containing information within the data structure that the serialization selector utilizes in determining a rule set.

8. The system of claim 1, the decision module is integrated into the pluggable formatter.

9. A system that facilitates employment of a pluggable formatter, comprising:
   a surrogate file that implements serialization instructions for all objects of a given type;
   a pluggable formatter selected from a variety of employed pluggable formatters that produces a decoded serialized stream based at least in part on the serialization instructions of the surrogate file;
   a formatter services component that receives the decoded serialized stream from the pluggable formatter and creates a data structure as a graph of objects for deserialization of the decoded serialized stream; and
   an object manager that tracks data in the decoded serialized stream and determines forward references to additional data to provide fixups to the data structure upon receipt of the additional data.

10. The system of claim 9, further comprising a serialization selector that determines a rule set of a plurality of rule sets to provide to the formatter services component based on the data structure type being deserialized, the formatting services component populates the data structure based on the determined rule set.

11. The system of claim 10, the rule set is definable in the data structure.

12. The system of claim 10, the rule set is in a third party file.

13. The system of claim 9, the formatter services component reinstantiates each object of a graph of objects and the object manager performs fixups on the objects after the graph of objects have been deserialized.

14. A method for deserialization of a stream into a graph of objects, the method comprising:
   implementing a predefined rule set for all objects of a certain type via a surrogate;
   selecting a pluggable formatter from a variety of employed pluggable formatters to provide a decoded serialized stream;
   receiving the decoded serialized stream from the pluggable formatter;
   retrieving from the decoded serialized stream an object from a graph of objects;
   determining an object type for deserialization;
   instantiating an uninitialized instance of the object type;
   selecting a serialization rule set from one of a user defined rule set in the object and a user defined rule set in another object and a default rule set; and
   populating the uninitialized instance of the object type based on the selected serialization rule set.

15. The method of claim 14, further comprising registering the object with an object manager.

16. The method of claim 14, further comprising tracking forward references to other objects within the object.

17. The method of claim 14, further comprising repeating retrieving, determining, instantiating and populating for each object in an object graph.

18. The method of claim 17, further comprising performing fixups on the objects in the object graph caused by forward references.

19. A system that facilitates making formatters pluggable, the system comprising:
   means for providing serialization information of an object from a graph of objects to a pluggable formatter through assignment of a surrogate file, so that the pluggable formatter can serialize the object in a selectable externalized format, the pluggable formatter is chosen from a variety of pluggable formatters implemented on the system;
   means for tracking deserialization of the object outside the pluggable formatter;
   means for instantiating an uninitialized instance of an object type, so that the object information can populate the object type; and
   means for performing fixups on the objects due to forward references.

* * * * *